United States Patent
Shinto

(10) Patent No.: US 8,514,441 B2
(45) Date of Patent: Aug. 20, 2013

(54) IMAGE PROCESSING APPARATUS AND CONTROL METHOD THEREOF, IN WHICH AN ADDRESS FOR IMAGE DATA DEPENDS ON WHETHER THE IMAGE DATA IS INPUT VIA A DETACHABLE IMAGE PROCESSING DEVICE

(75) Inventor: Yasushi Shinto, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 759 days.

(21) Appl. No.: 12/635,242

(22) Filed: Dec. 10, 2009

(65) Prior Publication Data
US 2010/0171987 A1 Jul. 8, 2010

(30) Foreign Application Priority Data
Jan. 7, 2009 (JP) .................................. 2009-001826

(51) Int. Cl.
*G06K 15/00* (2006.01)

(52) U.S. Cl.
USPC ........ 358/1.16; 358/1.13; 358/1.17; 345/537; 348/231.3; 348/231.2; 382/312; 382/305

(58) Field of Classification Search
USPC ............... 358/1.16, 1.17, 444, 443, 2.1, 3.21, 358/3.1, 474; 345/536, 537, 550, 549, 544, 345/543, 541, 564, 565, 571, 573, 602, 563
See application file for complete search history.

(56) References Cited

U.S. PATENT DOCUMENTS

| | | | | |
|---|---|---|---|---|
| 4,016,544 A | * | 4/1977 | Morita et al. .................. | 345/550 |
| 4,811,109 A | * | 3/1989 | Shimizu et al. ............... | 358/453 |
| 5,038,300 A | * | 8/1991 | Seiler et al. .................... | 345/602 |
| 5,721,884 A | * | 2/1998 | Shishizuka et al. ........... | 345/537 |
| 6,629,161 B2 | * | 9/2003 | Matsuki et al. ................. | 710/22 |
| 7,495,669 B2 | * | 2/2009 | Ushida et al. ................. | 345/537 |
| 7,675,523 B2 | * | 3/2010 | Ushida et al. ................. | 345/537 |
| 7,876,968 B2 | * | 1/2011 | Chang ........................... | 382/245 |
| 8,078,011 B2 | * | 12/2011 | Kuwahara ..................... | 382/312 |
| 2001/0017658 A1 | * | 8/2001 | Kuroiwa ....................... | 348/273 |
| 2004/0130750 A1 | | 7/2004 | Ushida et al. ................ | 358/1.16 |
| 2005/0062860 A1 | * | 3/2005 | Kuroiwa .................. | 348/231.99 |

FOREIGN PATENT DOCUMENTS
JP 2004-220585 8/2004

* cited by examiner

*Primary Examiner* — Dennis Dicker
(74) *Attorney, Agent, or Firm* — Fitzpatrick, Cella, Harper & Scinto

(57) ABSTRACT

To provide an image processing apparatus that changes methods of storage to a memory depending on image data to be input and improves overall image processing performance, as well as a control method of the image processing apparatus. To accomplish this, the present image processing apparatus changes methods in which input image data is stored depending on whether scanner image processing is to be performed by a system control unit that comprehensively controls the image processing apparatus or performed outside of the system control unit. Specifically, when performing scanner image processing in the system control unit, since input image data is to be input directly from a CCD, the image data is stored frame-sequentially in a memory. On the other hand, when performing scanner image processing outside of the system control unit, input image data is stored dot-sequentially in a memory.

9 Claims, 15 Drawing Sheets

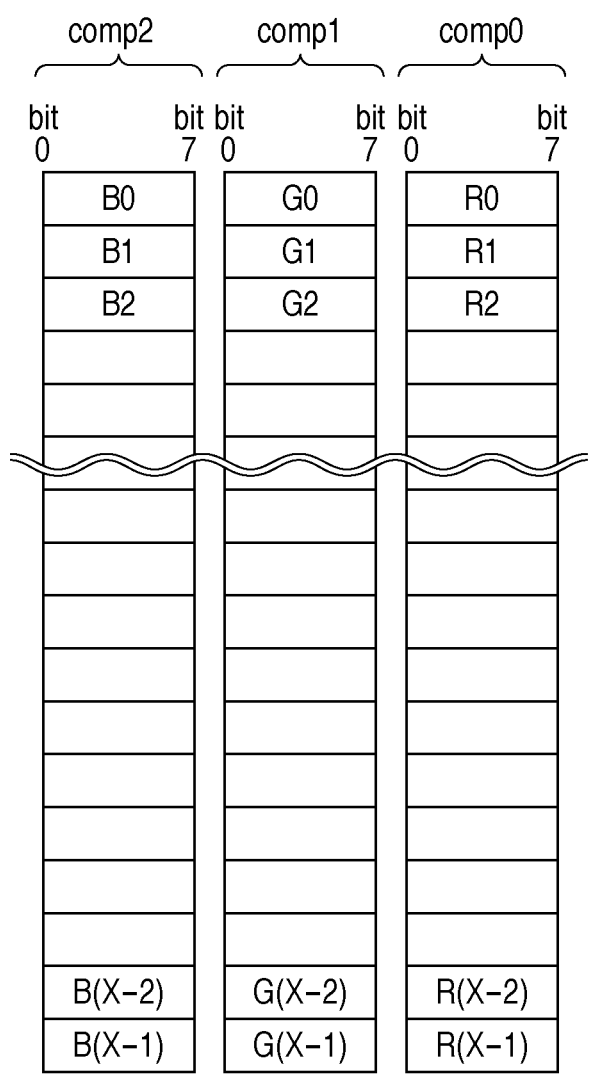
F I G. 7

FIG. 9

| comp2 | comp1 | comp0 |
|---|---|---|
| bit 0 – bit 7 | bit 0 – bit 7 | bit 0 – bit 7 |
| R(N+0) | R(M+0) | R0 |
| G(N+0) | G(M+0) | G0 |
| B(N+0) | B(M+0) | B0 |
| R(N+1) | R(M+1) | R1 |
| G(N+1) | G(M+1) | G1 |
| B(N+1) | B(M+1) | B1 |
| R(N+2) | R(M+2) | R2 |
| G(N+2) | G(M+2) | G2 |
| B(N+2) | B(M+2) | B2 |
| | | |
| ≈ | ≈ | ≈ |
| | | |
| R(X−2) | | |
| G(X−2) | | |
| B(X−2) | | |
| R(X−1) | | |
| G(X−1) | | |
| B(X−1) | | |
| 0 | | |
| 1 | | |
| | | |
| ≈ | ≈ | ≈ |
| | R(N−2) | R(M−2) |
| | G(N−2) | G(M−2) |
| | B(N−2) | B(M−2) |
| | R(N−1) | R(M−1) |
| P−2 | G(N−1) | G(M−1) |
| P−1 | B(N−1) | B(M−1) |

FIG. 15
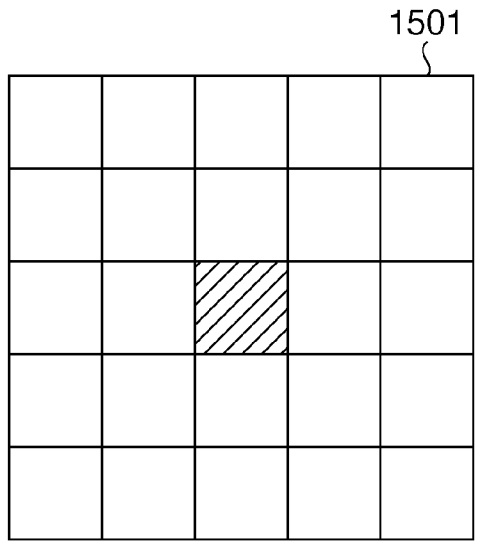
FILTERING TABLE 1501
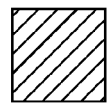 : PIXEL OF INTEREST
| a11 | a12 | a13 | a14 | a15 |
|---|---|---|---|---|
| a21 | a22 | a23 | a24 | a25 |
| a31 | a32 | a33 | a34 | a35 |
| a41 | a42 | a43 | a44 | a45 |
| a51 | a52 | a53 | a54 | a55 |
EMPHASIS COEFFICIENT 1502
| b11 | b12 | b13 | b14 | b15 |
|---|---|---|---|---|
| b21 | b22 | b23 | b24 | b25 |
| b31 | b32 | b33 | b34 | b35 |
| b41 | b42 | b43 | b44 | b45 |
| b51 | b52 | b53 | b54 | b55 |
SMOOTHING COEFFICIENT 1503

IMAGE PROCESSING APPARATUS AND CONTROL METHOD THEREOF, IN WHICH AN ADDRESS FOR IMAGE DATA DEPENDS ON WHETHER THE IMAGE DATA IS INPUT VIA A DETACHABLE IMAGE PROCESSING DEVICE

BACKGROUND OF THE INVENTION

1. Field of the Invention

The present invention relates to an image reading device that reads an image from an original document, an image processing apparatus including a memory for storing a read image, and a control method thereof.

2. Description of the Related Art

Existing image processing apparatuses provide functions for reading an image from an original document and storing the image in a memory or transmitting the image to another apparatus. With respect to such image processing apparatuses, a technique has been proposed in which work memory is shared in a main memory to reduce the amount of internal buffer and to reduce cost. In addition, the capacity of the main memory is reduced by compressing image data to be stored in the main memory. As shown, a generally-used method involves sharing a memory in order to reduce memory capacity required by the respective processing blocks and to reduce cost.

Image processing performed by a general image processing apparatus will now be described. With an image processing apparatus, image data input from a CCD (charge coupled device) that is an image reading device is subjected to A/D conversion and stored in a main memory. The image data stored in the main memory is subjected to image processing and JPEG compression, and subsequently, once again stored in the main memory. When using the data, only necessary data is read out from the main memory to be expanded and printed. Such write processing from the respective processing blocks to the main memory and read processing from the main memory is controlled by a DMAC (direct memory access controller).

Japanese Patent Laid-Open No. 2004-220585 proposes an image processing apparatus including a DMAC corresponding to image data to be input from an image reading device such as a CCD and which frame-sequentially stores the image data in different regions on the main memory. However, image compression/expansion processing (JPEG, JBIG, and the like) is performed on dot-sequential image data. In consideration thereof, the image processing apparatus according to Japanese Patent Laid-Open No. 2004-220585 improves image processing efficiency by reading image data frame-sequentially stored on the main memory, and after performing scanner image processing, storing the image data in an arrangement suitable for subsequent-stage image processing (dot sequential).

However, the conventional art described above has the following problem. Since the aforementioned image processing apparatus shares a main memory, a greater amount of data is transferred on a bus used by image processing, causing a decline in the overall performance of the system. In particular, a scanner I/F and a scanner image processing unit handle data per line and therefore require large memory regions. Consequently, a performance decline occurs such as becoming unable to accommodate a high-speed reading device.

A conceivable solution to the problem described above involves performing scanner image processing outside of a main control system that integrally controls an image processing apparatus for the purpose of accommodating a high-speed reading device. However, even if data after image processing is input via a scanner I/F, since the input data is to be stored frame-sequentially, a frame-sequential-to-dot-sequential conversion becomes necessary. Therefore, used memory cannot be reduced and the overall performance of the image processing apparatus cannot be improved. Furthermore, since data after scanner image processing sometimes includes image area data or the like in addition to image data, performing scanner image processing outside of the system also requires that transferring data other than image data be considered.

SUMMARY OF THE INVENTION

The present invention enables realization of an image processing apparatus that changes methods of storage to a memory depending on image data to be input and improves overall image processing performance, as well as a control method of the image processing apparatus.

One aspect of the present invention provides an image processing apparatus that stores image data output from a reading device that reads an original document and generates image data, the image processing apparatus comprising: an input unit that inputs image data read by the reading device; a storage unit that stores image data input by the input unit; a determination unit that determines whether image data to be input by the input unit is image data to be input via an image processing device that performs image processing on the image data or image data to be input without involving the image processing device; a designation unit that designates, based on a determination result by the determination unit, an address for storing image data input from the reading device via the image processing device or image data input from the reading device without involving the image processing device into the storage unit; and a control unit that controls the apparatus so that image data input by the input unit is stored in the storage unit according to the address designated by the designation unit.

Another aspect of the present invention provides a control method of an image processing apparatus that stores image data output from a reading device that reads an original document and generates image data, the control method comprising: inputting image data read by the reading device; determining whether image data to be input in the inputting step is image data to be input via an image processing device that performs image processing on the image data or image data to be input without involving the image processing device; designating, based on a determination result in the determining step, an address for storing image data input from the reading device via the image processing device or image data input from the reading device without involving the image processing device into a storage unit; and storing image data input in the inputting step into the storage unit according to the address designated in the designating step.

Further features of the present invention will be apparent from the following description of exemplary embodiments with reference to the attached drawings.

BRIEF DESCRIPTION OF THE DRAWINGS

FIG. 7 is a diagram illustrating a transfer format of RGB data output from an AFE 141 according to the first embodiment;

FIG. 9 is a diagram illustrating a transfer format of data after data division processed by a data rearrangement unit 220 according to the first embodiment;

FIG. 15 is a diagram illustrating methods of utilizing image area data in filtering.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
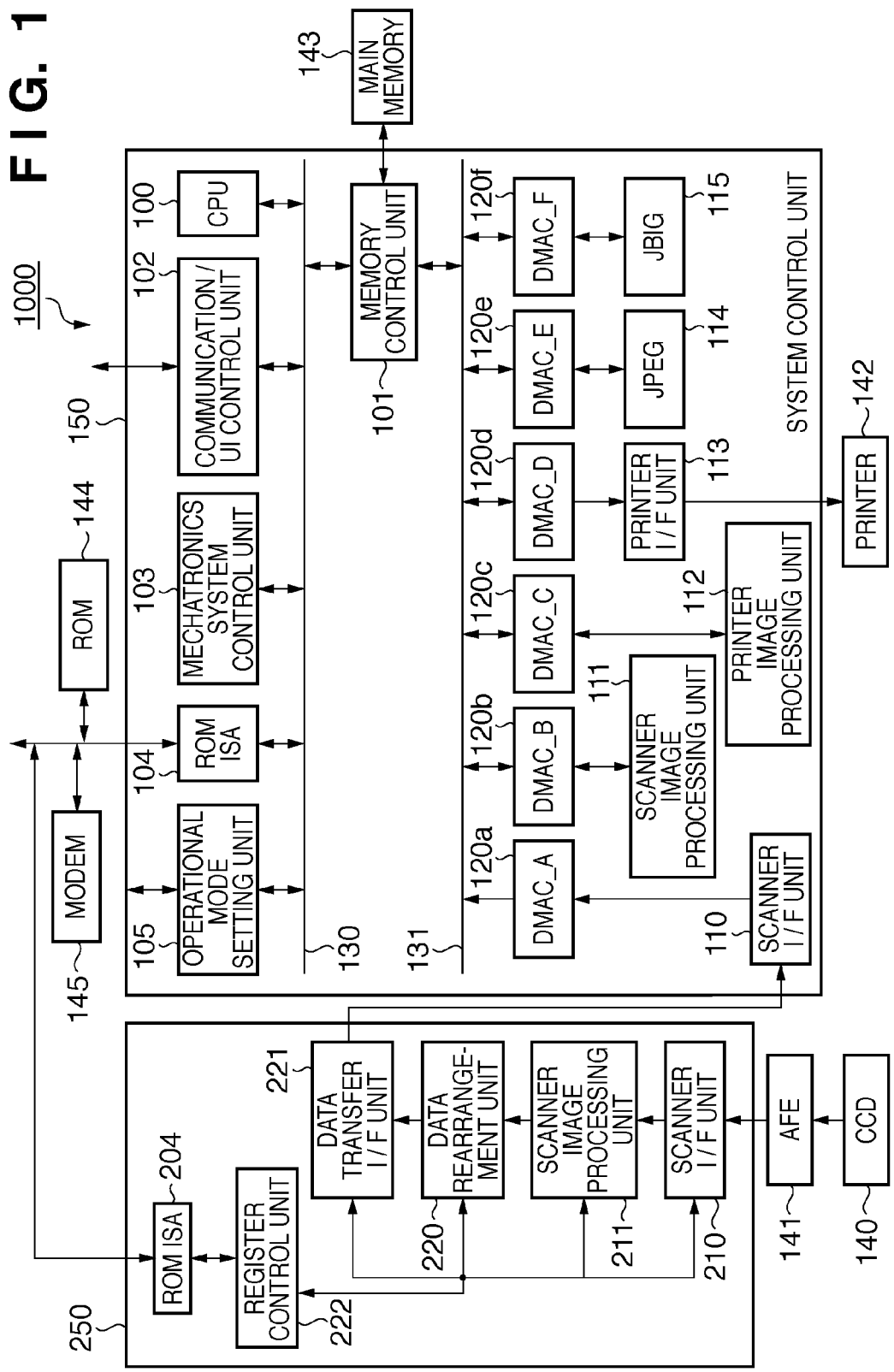
FIG. 1 is a block diagram illustrating a schematic configuration example of an image processing apparatus 1000 according to a first embodiment.
Figure 2:
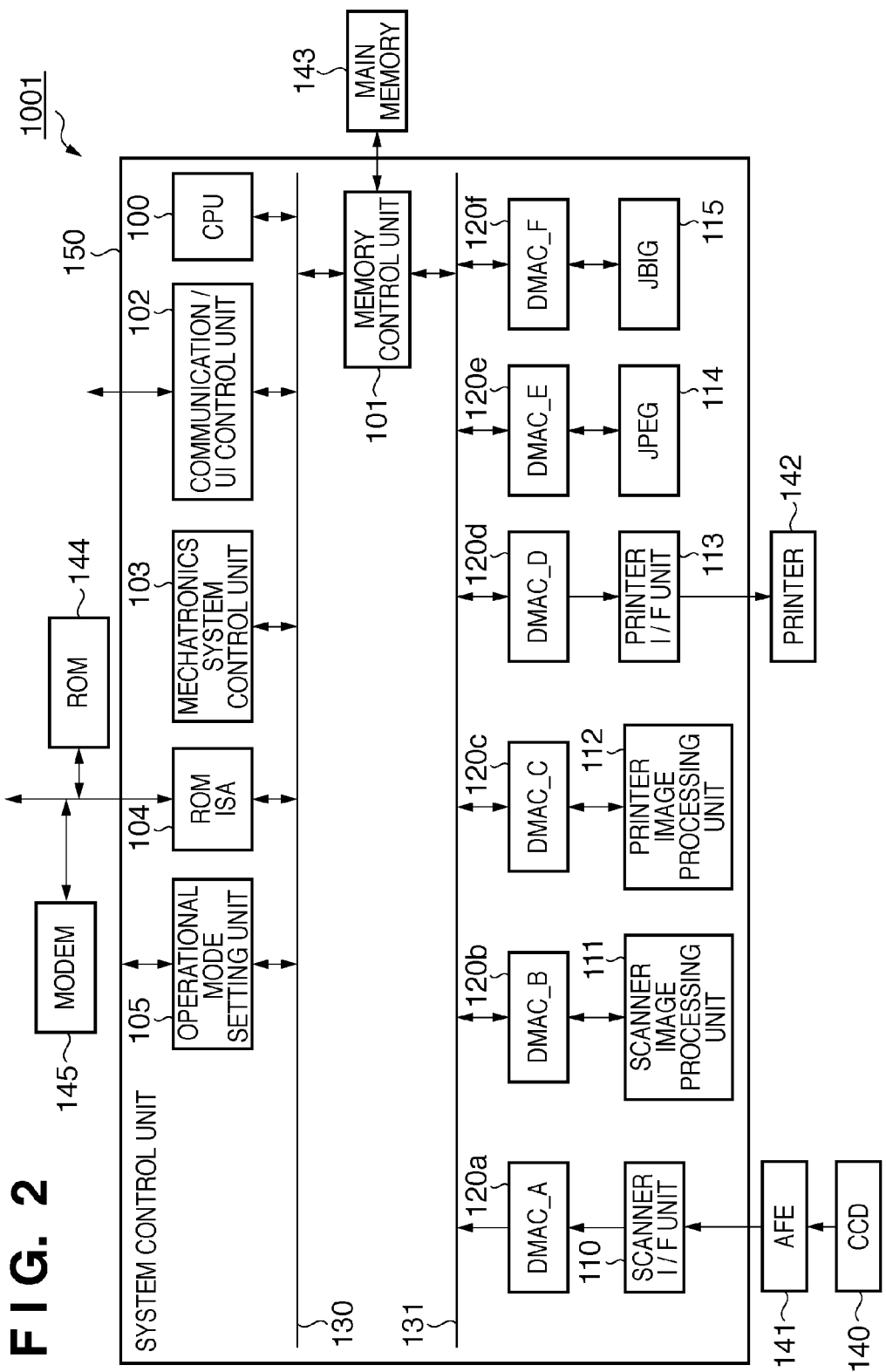
FIG. 2 is a block diagram illustrating a schematic configuration example of an image processing apparatus 1001 according to the first embodiment.

Hereinafter, a first embodiment will be described with reference to FIGS. 1 to 10. FIG. 1 is a block diagram illustrating a schematic configuration example of an image processing apparatus 1000 according to the first embodiment. FIG. 2 is a block diagram illustrating a schematic configuration example of an image processing apparatus 1001 according to the first embodiment.

System control units 150 illustrated in FIGS. 1 and 2 share the same block configuration. A scanner interface (hereinafter referred to as "scanner I/F") unit 110 illustrated in FIG. 1 is an individual application-specific circuit to which a scanner image processing block 250 that performs scanner image processing is connected. On the other hand, a CCD 140 is directly connected to a scanner I/F unit 110 illustrated in FIG. 2 via an analog front end (AFE) 141. Data read by the CCD 140 is loaded into the system control units 150 without involving an individual application-specific circuit. While FIG. 1 represents a characteristic configuration of the present invention, the two configurations illustrated in FIGS. 1 and 2 may be switched depending on the operational mode.

First, the system control unit 150 of the image processing apparatus 1001 illustrated in FIG. 2 will be described. The system control unit 150 functions as a first control unit and comprehensively controls the image processing apparatus. Reference numeral 111 denotes a scanner image processing unit which executes partial image processing on image data developed on a main memory 143 by the scanner I/F unit 110 and a DMAC_A 120a. Details of the scanner I/F unit 110 and the DMAC_A 120a will be described later. A printer image processing unit 112 is a processing unit for printing out image data obtained through image processing, and outputs image processing results to a printer 142 connected via a printer I/F 113. Reference numerals 114 and 115 respectively denote a JPEG module and a JBIG module which execute image data compression and expansion in compliance with a predetermined standard.

Reference numeral 101 denotes a memory control unit to be connected to an image processing system bus 131 and a computer system bus 130. The memory control unit 101 carries out overall control of DMAC_A to DMAC_F (120a to 120f) which execute DMA control regarding writing and reading data into/from the main memory 143. Here, "DMA (direct memory access) control" refers to control which directly moves data between a main memory and peripherals.

DMAC_A to DMAC_F (120a to 120f) are connected between the respective image processing units 110 to 115 described above and the bus 131, and execute DMA control of data. Each of the DMACs A to F (120a to 120f) designate a predetermined address for executing DMA control in regards to sending and receiving data between each image processing unit (110 to 115) and the main memory 143, and perform DMA control based on the designated address.

For example, the DMAC_A 120a generates, for each DMA channel, address information for performing a DMA transfer of image data acquired by the scanner I/F unit 110 to the main memory 143. In this case, address information refers to a start address from where DMA is to be started, offset information which switches memory addresses, and the like.

In addition, the DMAC_B 120b generates, in correspondence to DMA channels, address information for reading image data developed on the main memory 143. The DMAC_C to DMAC_F (120c to 120f) similarly generate predetermined address information, and based on the information, execute DMA control regarding sending and receiving data to/from the main memory 143. In other words, the DMAC_C to DMAC_F (120c to 120f) have channels corresponding to data write and data read, and perform DMA control by generating address information corresponding to the channels.

The bus 131 is connected to the respective image processing units (110 to 115) and is capable of sending and receiving data to/from the respective blocks. On the other hand, the bus 130 is connected to a CPU 100, a communication/UI control unit 102, a mechatronics system control unit 103, a ROM-ISA 104, and an operational mode setting unit 105, and is capable of sending and receiving data to/from the respective blocks. The ROM-ISA 104 is a bus to which a ROM 144 is connected.

The CPU 100 controls the aforementioned DMAC_A to DMAC_F (120a to 120f) based on a control parameter and a control program stored in the ROM 144. In addition, the CPU 100 controls overall operations of the image processing apparatus.

The operational mode setting unit 105 is capable of referencing a state (value) of an external pin of an LSI through the CPU 100. By setting an operational mode, operations of the system can be fixed. The external pin of the LSI functions as a switching unit that switches between enabling and disabling the scanner image processing block 250, to be described later.

<Data Read/Write Control in Configuration Illustrated in FIG. 2>

Hereinafter, write control of data to the main memory 143 and read control of data from the main memory 143 in the configuration illustrated in FIG. 2 will be described with reference to FIGS. 3 to 5.

An output signal of the image reading device (CCD 140) is input in parallel for each color component to the AFE (analog front end) 141. The AFE 141 performs gain adjustment and A/D conversion on the output signal of the CCD 140 and converts an analog signal output from each image reading device to a digital signal. The AFE 141 inputs the converted digital signals in parallel for each color component into the scanner I/F unit 110 (parallel transfer). The image data input at this point is DMA-transferred by the DMAC_A 120*a* and developed on the main memory 143.

Figure 3:
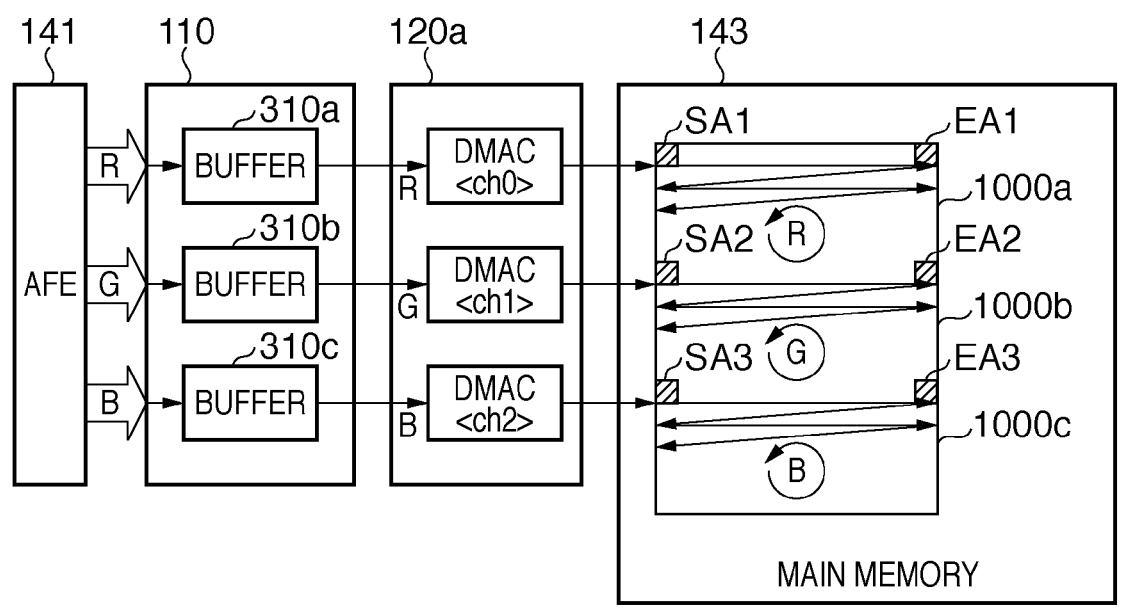
FIG. 3 is a diagram for describing operations of a scanner I/F unit and a DMAC_A according to the first embodiment.

After reading the color image data using the CCD 140, the scanner I/F unit 110 causes the data received from the AFE 141 to be sorted by color component (R, G, and B) and respectively temporarily stored in three buffers (respective buffers 310*a*, 310*b*, and 310*c* illustrated in FIG. 3). Next, processing performed by the scanner I/F unit 110 to DMA-transfer and store image data stored in predetermined buffers (310*a*, 310*b*, and 310*c*) to the main memory 143 will be described. The processing of DMA-transferring to and storing image data in the main memory 143 is to be controlled by the DMAC_A 120*a*.

The DMAC_A 120*a* is a DMAC for DMA-transferring image data read by the CCD 140 to the main memory 143. In addition, the DMAC_B 120*b* is a DMAC for controlling DMA between the main memory 143 and the scanner image processing unit 111.

Figure 5:
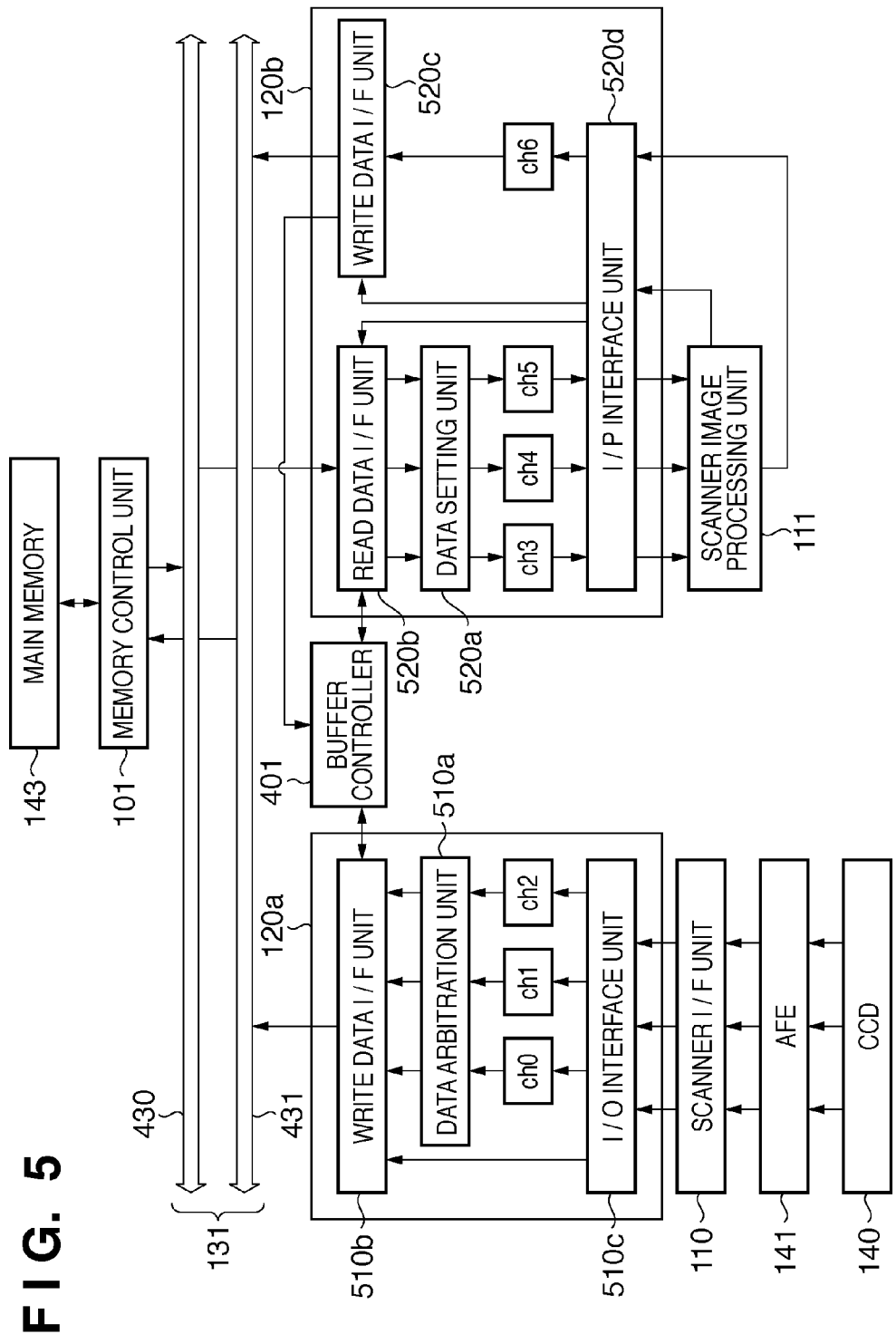
FIG. 5 is a diagram illustrating a schematic configuration example of the DMAC_A and the DMAC_B according to the first embodiment.

FIG. 5 is a diagram illustrating a schematic configuration example of the DMAC_A and the DMAC_B according to the first embodiment. Reference numeral 401 denotes a buffer controller which controls, when the main memory 143 is used as a ring buffer, the DMAC_A 120*a* and the DMAC_B 120*b* to arbitrate data write and read. As illustrated in FIG. 5, the DMAC_A 120*a* includes a data arbitration unit 510*a*, a write data I/F unit 510*b*, and an I/O interface unit 510*c*.

The I/O interface unit 510*c* sets predetermined address information generated by the DMAC_A 120*a* to the write data I/F unit 510*b* in order to store data in the main memory 143. In addition, the I/O interface unit 510*c* receives image data from the scanner I/F unit 110 and stores the data in respective buffer channels (hereinafter referred to as "channels") ch0 to ch2 in the DMAC_A 120*a*.

The write data I/F unit 510*b* is connected to a bus 431 for writing data into the main memory 143, and DMA-transfers data stored in the respective channels ch0 to ch2 to the main memory 143 according to generated predetermined address information. At this point, image data is stored frame-sequentially. Image data being stored frame-sequentially means that the image data is stored in units of pages for each color component.

The data arbitration unit 510*a* reads data stored in the respective channels, and in accordance with write processing by the write data I/F unit 510*b*, receives and delivers the data of the respective channels. The write data I/F unit 510*b* is connected to the buffer controller 501, and is controlled so that memory access does not conflict with data write or read by the DMAC_B 120*b*, to be described later. Due to such access control over the main memory 143, even when the main memory 143 is used as a ring buffer, problems such as overwriting data on a same memory address prior to reading out the data can be prevented.

The DMAC_B 120*b* includes a data setting unit 520*a*, a read data I/F unit 520*b*, a write data I/F unit 520*c*, and an I/P interface unit 520*d*.

In order to read data from the main memory 143 and write data into the main memory 143, the I/P interface unit 520*d* reads predetermined address information generated by the DMAC_B 120*b* and sets the address information to the read data I/F unit 520*b* and the write data I/F unit 520*c*.

Reading of data stored in the main memory 143 is controlled by the DMAC_B 120*b*. The read data I/F unit 520*b* is connected to the main memory 143 via the bus 430 and the memory control unit 101. In addition, the read data I/F unit 520*b* is capable of referencing address information generated by the DMAC_B 120*b* to read predetermined image data from the main memory 143. In this case, data is to be read frame-sequentially.

The read data is set to a plurality of provided predetermined channels ch3 to ch5 by the data setting unit 520*a*. For example, frame-sequential R data is set to the channel ch3, frame-sequential G data is set to the channel ch4, and frame-sequential B data is set to the channel ch5.

Data set to the respective channels ch3 to ch5 is sequentially DMA-transferred via the I/P interface unit 520*d* and handed over to the scanner image processing unit 111.

In addition, a channel ch6 stores dot-sequential image data output from the scanner image processing unit 111 in order to store data subjected to predetermined image processing in the main memory 143. Image data being stored dot-sequentially means that image data is stored in units of pixels for each color component. The scanner image processing unit 111 outputs address information and respective control signals in accordance with the output of dot-sequential image data. Based on this information, the write data I/F unit 520*c* writes image data stored in the channel ch6 into a corresponding region in the main memory 143 via the memory control unit 101.

FIG. 3 is a diagram for describing operations of a scanner I/F unit and the DMAC_A according to the first embodiment. Hereinafter, a description will be given on processing performed by a DMAC corresponding to each component to write data into the main memory 143 when the scanner I/F unit 110 processes image data (R, G, B data) of the three components is read by the CCD 140.

The scanner I/F unit 110 includes three buffers 310*a*, 310*b* and 310*c* which store, for each color of RGB, image data acquired from the AFE 141. Under control of the DMAC_A 120*a*, data stored in each buffer 310*a* to 310*c* is transferred to the channels ch0, ch1, and ch2.

Data transferred to the ch0 is written into the main memory 143 by a DMAC corresponding to the ch0. In addition, data transferred to the ch1 is written into the main memory 143 by a DMAC corresponding to the ch1. Moreover, data transferred to the ch2 is written into the main memory 143 by a DMAC corresponding to the ch2.

By having each DMAC write data into regions corresponding to an R region (1000*a*), a G region (1000*b*), and a B region (1000*c*) of the main memory 143, R, G, and B data can be separated from each other and stored frame-sequentially on the main memory 143. Data to be written into each region is written from a start address up to an end address positioned ahead of the start address by the number of main scanning pixels. As one line's worth of data is written, a start address and an end address of a next line are set to the DMAC. In this case, start addresses SA1, SA2, and SA3 from which DMA transfer is to be started, as well as end addresses EA1, EA2, and EA3, are generated by the DMAC_A 120a described above.

Figure 4:
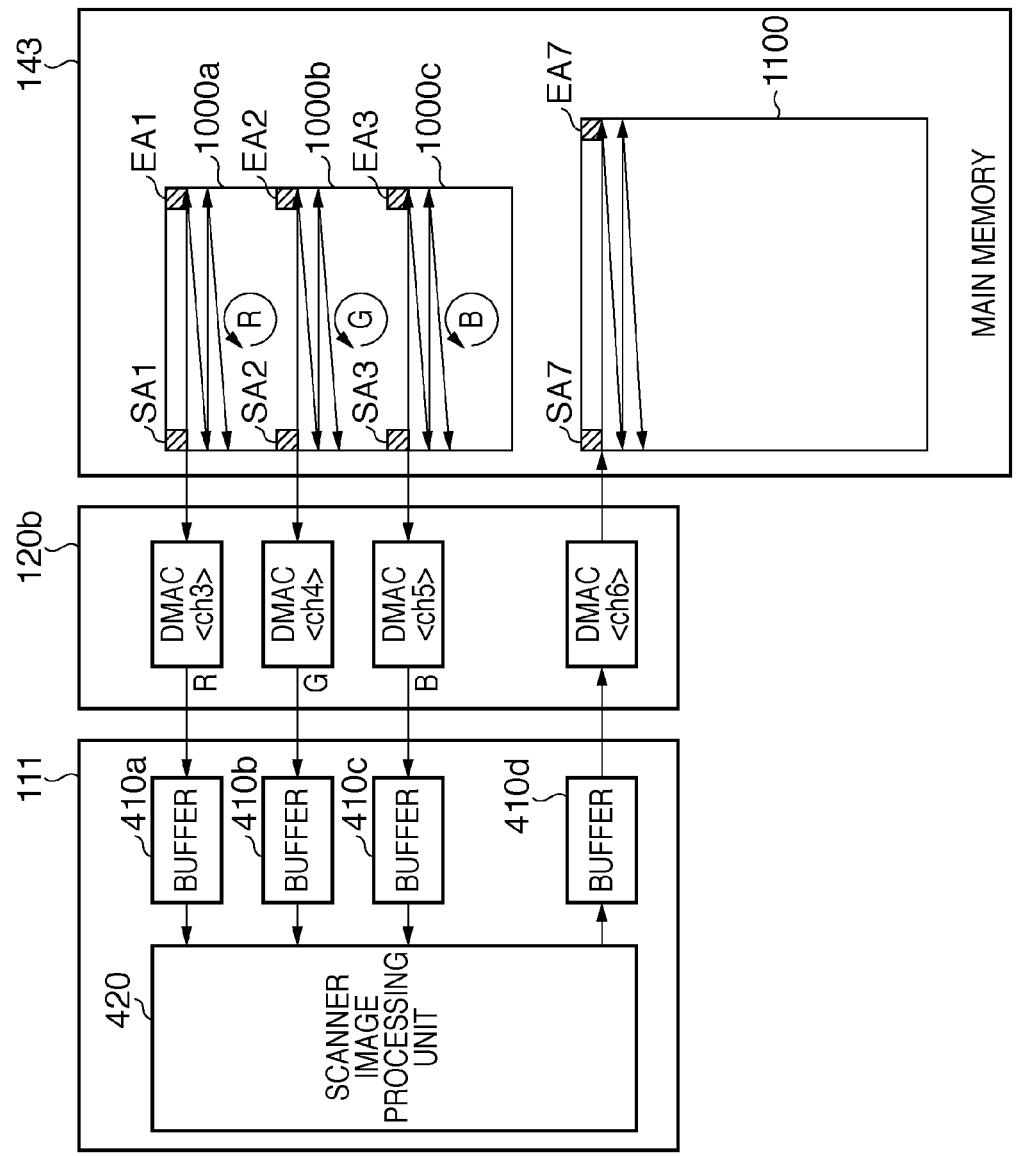
FIG. 4 is a diagram for describing operations of a scanner image processing unit and a DMAC_B according to the first embodiment.

FIG. 4 is a diagram for describing operations of a scanner image processing unit and the DMAC_B according to the first embodiment. The scanner image processing unit 111 is an image processing unit for image data read by the CCD 140, and reads R, G, and B data stored frame-sequentially on the main memory 143 by the DMAC_B 120b to perform image processing thereon. To this end, the scanner image processing unit 111 includes three buffers 410a, 410b, and 410c.

Data stored in the respective buffers 410a to 410c are first read from the main memory 143 by the DMAC_B 120b and stored per R, G, and B data in channels ch3, ch4, and ch5 of the DMAC_B 120b. Data to be stored in the ch3 is read from the main memory 143 by a DMAC corresponding to the ch3. In addition, data to be stored in the ch4 is read from the main memory 143 by a DMAC corresponding to the ch4. Furthermore, data transferred to the ch5 is read from the main memory 143 by a DMAC corresponding to the ch5. DMACs corresponding to ch3 to ch5 read data from regions corresponding to the R region (1000a), the G region (1000b), and the B region (1000c) on the main memory 143.

Data to be read from each region is read from a start address up to an end address positioned ahead of the start address by the number of main scanning pixels. As one line's worth of data is read, a start address and an end address of a next line is set to the DMAC. In this case, start addresses SA1, SA2, and SA3 from which DMA transfer is to be started, as well as end addresses EA1, EA2, and EA3, are generated by the DMAC_B 120b described above.

Data stored in the DMACs corresponding to ch3 to ch5 is respectively stored in the buffers 410a to 410c and subjected to scanner image processing by the scanner image processing unit 420. Image data subjected to image processing by the scanner image processing unit 420 is stored dot-sequentially in a buffer 410d. Furthermore, the image data is stored in a DMAC corresponding to the ch6 of the DMAC_B 120b, and is DMA-transferred to and stored on the main memory 143.

In addition, data subjected to image processing by the scanner image processing unit 111 is processed by JPEG 114. Since image processing by JPEG 114 expects data to be stored dot-sequentially, image data processed by the scanner image processing unit 111 is DMA-transferred to the main memory 143 so as to be stored dot-sequentially.

Data after scanner image processing is written from a start address SA7 on the main memory 143 up to an end address EA7 positioned ahead of the start address by the number of main scanning pixels. As one line's worth of data is written, a start address and an end address of a next line are set to the DMAC. In this case, the start address SA7 at which DMA transfer is to be started, as well as the end address EA7, are to be generated by the aforementioned DMAC_B 120b.

As described above, with the image processing apparatus 1001, R, G, and B data output from the CCD 140 is stored via DMA transfer into different regions on the main memory 143. Therefore, a scanner image processing unit 111 in a subsequent stage which performs frame-sequential image processing need only DMA-transfer the image data on the main memory 143. In addition, image data subjected to scanner image processing is dot-sequentially stored on the main memory 143. Therefore, even when performing compression at a subsequent-stage JPEG 114 that dot-sequentially performs image processing, image data on the main memory 143 need only be read out by DMA transfer. Accordingly, the image processing apparatus 1001 according to the present embodiment achieves efficient memory access.

<Data Read/Write Control in Configuration Illustrated in FIG. 1>

Next, data read/write control in the configuration illustrated in FIG. 1 in which scanner image processing is performed outside a system control unit 150 will be described with reference to FIGS. 6 to 10. As illustrated in FIG. 1, an image processing apparatus 1000 according to the present embodiment includes a scanner image processing block 250 that functions as a second control unit between a scanner I/F unit 110 and an AFE 141. Accordingly, the image processing apparatus 1000 can now perform scanner image processing also outside of a system control unit 150, and can reduce the processing load on the system control unit 150. Since the configuration of the system control unit 150 is similar to the configuration described with reference to FIG. 2, a description thereof will be omitted.

Hereinafter, the scanner image processing block 250 will be described. The scanner image processing block 250 includes a ROM-ISA 204, a register control unit 222, a data transfer I/F unit 221, a data rearrangement unit 220, a scanner image processing unit 211, and a scanner I/F unit 210. Since the configurations of the scanner I/F unit 210 and the scanner image processing unit 211 are fundamentally the same as those of the scanner I/F unit 110 and the scanner image processing unit 111 in the system control unit 150, descriptions thereof will be omitted. In addition, as described with reference to FIG. 2, image data to be output from the scanner image processing unit 211 is dot-sequential data.

The data rearrangement unit 220 performs rearrangement of dot-sequential image data output from the scanner image processing unit 211 and divides the image data into parts equal to the number of components (the number of color components) of the reading device. In this case, the number of components refers to the number of the three color components (R, G, and B) included in image data. In the present embodiment, the first and second sets of divided data are set so as to equal or exceed one third of the number of main scanning pixels, and the third set of divided data is arranged so as to have the same number of pixels as the first and second sets of divided data by padding image data to image data remaining after subtracting the first and second sets of divided data from the number of main scanning pixels. Details of rearrangement and division will be described later.

The data transfer I/F unit 221 transfers, in parallel, data divided into sets equal to the number of components by the data rearrangement unit 220 as data of the respective components.

Control of the respective processing units (210, 211, 220, and 221) is performed by the register control unit 222. Setting of the register control unit 222 is performed from the outside via the ROM-ISA 204.

Figure 6:
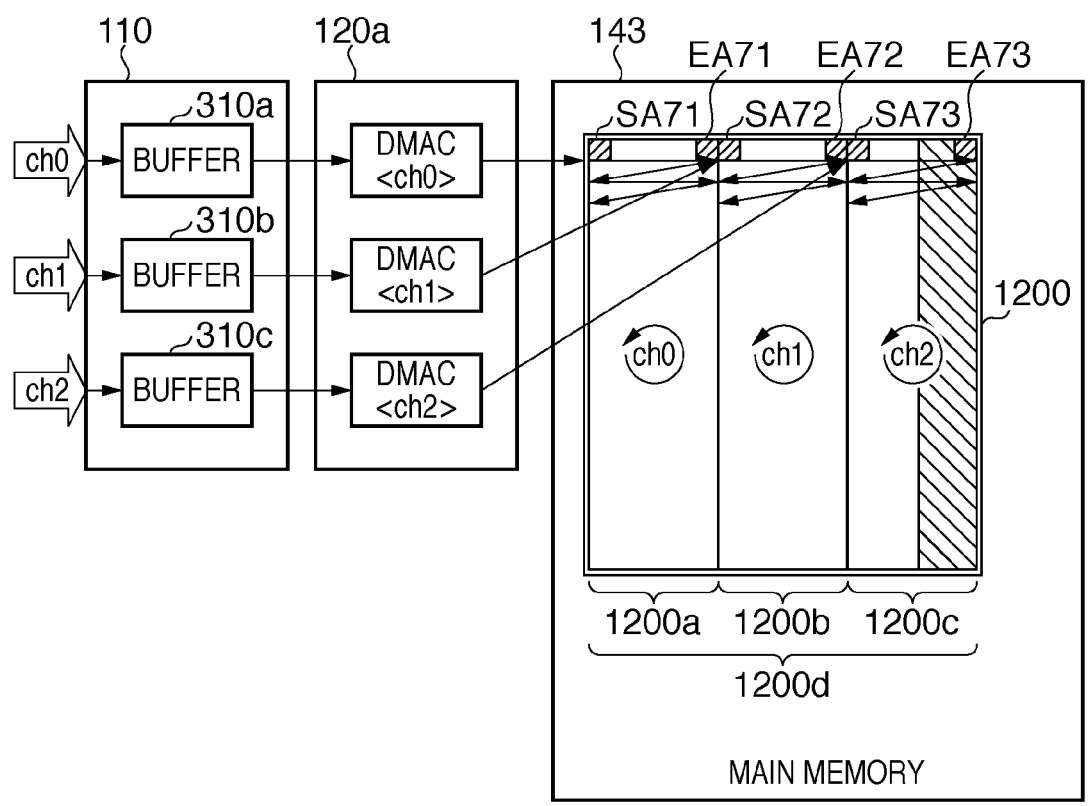
FIG. 6 is a diagram for describing operations of a scanner I/F unit and the DMAC_A according to the first embodiment.

FIG. 6 is a diagram for describing operations of a scanner I/F unit and the DMAC_A according to the first embodiment. FIG. 6 illustrates processing performed by a DMAC corresponding to each channel to write data into the main memory 143 when image data after image processing by the scanner image processing block 250 is input from the scanner I/F unit 110.

Data to be input to the scanner I/F unit 110 is stored in parallel in three buffers 310a, 310b, and 310c, and is written into the main memory 143 under the control of the DMAC_A 120a. DMAC corresponding to channels ch0 to ch2 involve respectively writing data into a region 1200a, a region 1200b, and a region 1200c of the main memory 143. Consequently, data to be input is stored dot-sequentially into a region 1200.

The respective regions 1200a, 1200b, and 1200c are defined by start addresses SA 71, SA72, and SA73, and by end addresses EA71, EA72, and EA73. In addition, the end address EA71 and the start address SA72, and the end address EA72 and the start address SA73, are respectively set to adjacent addresses. Furthermore, a region 1200d represents a main scanning width (the number of pixels in one line).

In this case, start addresses SA71, SA72, and SA73 from which DMA transfer is to be started, as well as end addresses EA71, EA72, and EA73, are generated by the DMAC_A 120a described above. The start addresses and the end addresses are to be determined based on the result of division performed by the data rearrangement unit 220.

In this case, the conditions described below are assumed.

Input format from reading device (CCD): frame-sequential data having 3 components (R, G, and B)

Number of bits of each component (R, G, and B) of reading device input data: 8 bits (0 to 255)

Data width of each component (R, G, and B) of scanner I/F: 8 bits

Number of main scanning pixels: X number of pixels

Number of sub scanning pixels: Y number of pixels

Operations of the image processing apparatus 1000 under the above conditions will now be described with reference to FIGS. 7 to 10.

Figure 8:
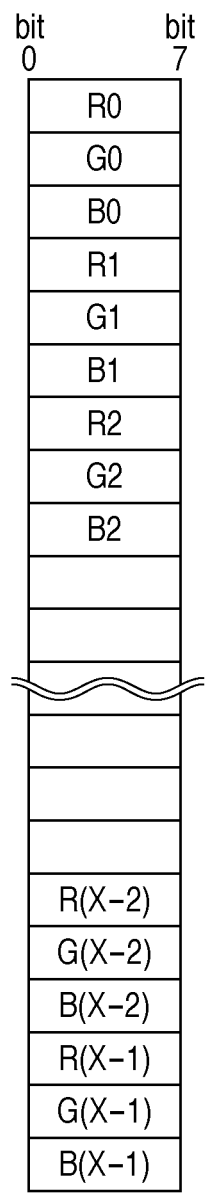
FIG. 8 is a diagram illustrating a transfer format of image data after image processing by a scanner image processing unit 211 according to the first embodiment.
Figure 10:
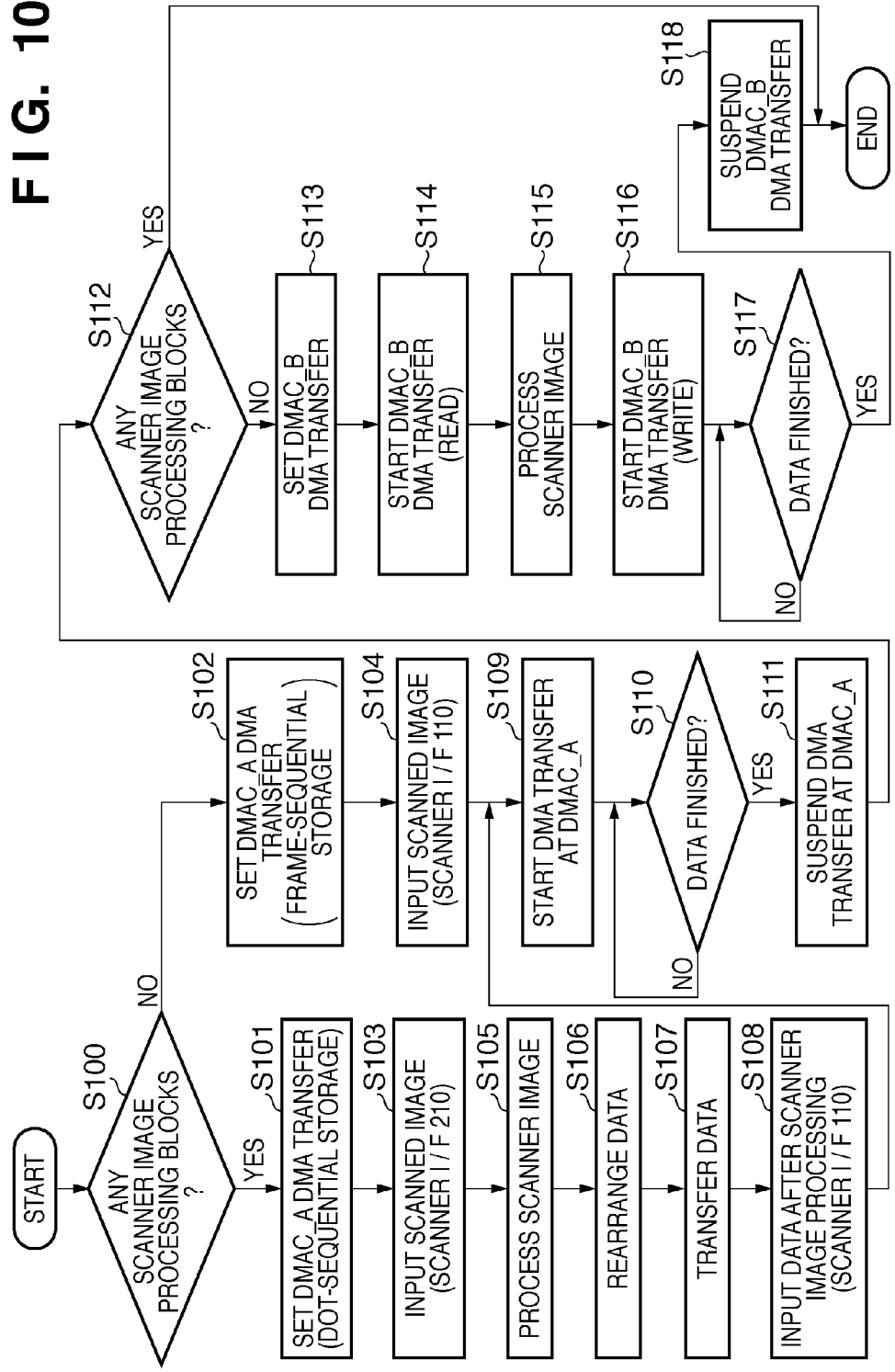
FIG. 10 is a flow chart illustrating a procedure of processing performed by the image processing apparatus 1000 according to the first embodiment.

FIG. 7 is a diagram illustrating a transfer format of RGB data output from the AFE 141 according to the first embodiment. FIG. 8 is a diagram illustrating a transfer format of image data after image processing by the scanner image processing unit 211 according to the first embodiment. FIG. 9 is a diagram illustrating a transfer format of data after data division processed by the data rearrangement unit 220 according to the first embodiment. FIG. 10 is a flow chart illustrating a procedure of processing performed by the image processing apparatus 1000 according to the first embodiment. The flowchart illustrated in FIG. 10 presents a processing procedure up to storing data after scanner image processing into the main memory.

First, in step S100, the CPU 100 of the system control unit 150 verifies the operational mode to which the operational mode setting unit 105 is set upon the conclusion of a boot sequence. As described above, the operational mode setting unit 105 is capable of referencing a state (value) of an external pin of an LSI. An operational mode such as whether the scanner image processing block 250 is to be used or not is set according to the setting of the external pin. For example, the scanner image processing block 250 can be set so as to be used by fixing a predetermined external pin to "1" and be set not to be used by fixing the external pin to "0". In other words, the external pin functions as switching means for switching operational modes. Therefore, the CPU 100 determines whether or not the scanner image processing block 250 is to be used or not based on information from the operational mode setting unit 105. At this point, when it is determined that the scanner image processing block 250 is to be used, the procedure advances to step S101. On the other hand, when it is determined that the scanner image processing block 250 is not to be used, the procedure advances to step S102.

When the scanner image processing block 250 is not used, in step S102, since image data is directly input to the scanner I/F unit 110 from the CCD 140, the CPU 100 sets transfer destination addresses (SA1 to SA3, EA1 to EA3) for the DMAC_A 120a so that input image data is frame-sequentially stored in the main memory 143. For example, an address that secures a memory space enabling one page's worth of R component data (X number of pixels times Y number of pixels) to be written from the start address SA1 is set as the start address SA2. In addition, an address that secures a memory space enabling one page's worth of G component data (X number of pixels times Y number of pixels) to be written from the start address SA2 is set as the start address SA3. Subsequently, in step S104, the CPU 100 acquires image data read from an original document via the scanner I/F unit 110.

On the other hand, when the scanner image processing block 250 is to be used, in step S101, since data after scanner image processing is input to the scanner I/F unit 210, the CPU 100 sets transfer destination addresses (SA71 to SA73, EA71 to EA73) for the DMAC_A 120a so that data corresponding to one line is consecutively stored. In this case, as described earlier, "EA71 and SA72" and "EA72 and SA73" are set so as to be adjacent addresses. In addition, memory spaces set by "SA71 to EA71", "SA72 to EA72", and "SA73 to EA73" are assumed to have the same size. Due to such settings, input data is stored dot-sequentially into the main memory 143.

In step S103, image data read by the CCD 140 is input via the AFE 141 to the scanner I/F unit 210 of the scanner image processing block 250. In this case, as the image data respectively input to the scanner I/F unit 210 and the scanner I/F unit 110 in steps S103 and S104, one line's worth (X number of pixels) of data of each component among RGB is to be transferred in parallel as illustrated in FIG. 7. As described above, the processing of steps S103 and S104 is performed inside the system control unit 150.

In step S105, the scanner image processing unit 211 performs scanner image processing on image data read by the CCD 140. As illustrated in FIG. 8, image data after scanner image processing is structured dot-sequentially, whereby data for each pixel of each component is to be transferred serially.

In step S106, the data rearrangement unit 220 performs division on the dot-sequential image data processed in step S105. If the number of divided pixels is defined as M, the data rearrangement unit 220 then divides one line's worth of dot-sequentially structured image data after scanner image processing into the three sets of "1st pixel to (M−1)th pixel" . . . <1>, "Mth pixel to (N−1)th pixel" . . . <2>, and "Nth pixel to (M+N−1)th pixel" . . . <3>.

The three divided sets of data correspond to one line's worth of image data and share the same data size.

In this case, N is "a value that is double the value of M" and M is a value equal to or greater than X. In addition, X is set to one third of a total transfer amount of data. In other words, M is a value equal to or greater than one third of the total transfer amount of data. This is because a single pixel is made up of three components (R, G, and B).

Furthermore, a padding value (e.g., all bits "0") is added to data set <3> or "Nth pixel to (M+N−1)th pixel" such as data corresponding to P number of pixels subsequent to the B(X−1)th pixel illustrated in FIG. 9. In addition, since data transfer requires a transfer time corresponding to M number of pixels, the value of M is desirably close to "a value equal to one third of X".

Data divided into three sets in step S106 is sent to the data transfer I/F unit 221. Subsequently, in step S107, the data transfer I/F unit 221 respectively transfers the data of <1>, <2>, and <3> described above onto data of the respective components of R, G, and B of the scanner I/F unit 110. On the other hand, in step S108, the CPU 100 acquires data processed by the scanner image processing block 250 via the scanner I/F unit 110. As described above, the processing of steps S103 to S107 is to be performed by the scanner image processing block 250.

In step S109, the DMAC_A 102a starts writing data input from the scanner I/F unit 110 into the main memory 143 according to the DMA transfer destination address set in step S101 or S102.

In step S110, the CPU 100 determines whether or not all data input from the scanner I/F unit 110 has been stored in the main memory 143. When all data has been stored in the main memory 143, the procedure advances to step S111.

In step S111, the CPU 100 sets the DMAC_A 102a to DMA transfer suspension. Subsequently, in step S112, the CPU 100 determines whether or not to use the scanner image processing block 250. This determination is the same as the determination made in step S100.

When the scanner image processing block 250 is used, since data after scanner image processing is dot-sequentially stored in the main memory 143 through processing up to step S111, the processing is terminated.

On the other hand, when the scanner image processing block 250 is not used, since data prior to scanner image processing (scanned image) is stored on the main memory 143, the procedure advances to step S113 to perform image processing by the scanner image processing unit 111.

In step S113, in order to read data stored in the main memory 143, the CPU 100 sets the DMAC_B 120b to DMA transfer. At the DMAC_B 120b, in order to read data stored in the main memory 143, the same addresses as the transfer destination addresses set to the respective DMACs in the DMAC_A 120a in step S102 are set as transfer destinations to the respective DMACs in the DMAC_B 120b. In addition, the transfer destination of a DMAC corresponding to the channel ch6 of the DMAC_B 120b is set to a location other than the memory spaces to which transfer has been performed by the respective DMACs of the DMAC_A 120a.

In step S114, the DMAC_B 120b reads image data of the respective R, G, and B components stored in the main memory 143 according to the DMA transfer setting set in step S113, and transfers the data to the scanner image processing unit 111. Subsequently, in step S115, the scanner image processing unit 111 performs image processing on images read from the reading device. Since data after scanner image processing is to be dot-sequential, data is written into the main memory 143 by a single DMAC (the DMAC corresponding to ch6) in the DMAC_B 120b.

In step S116, the DMAC_B 120b writes into the main memory 143, as needed, data subjected to scanner image processing. Subsequently, in step S117, the CPU 100 determines whether or not all data subjected to scanner image processing has been stored in the main memory 143. When all data has been stored in the main memory 143, the procedure advances to step S118. In step S118, the CPU 100 sets the DMAC_B 102b to DMA transfer suspension.

As described above, an image processing apparatus according to the present embodiment changes methods in which input image data is stored depending on whether scanner image processing is to be performed by a system control unit that comprehensively controls the image processing apparatus or performed outside of the system control unit. Specifically, when performing scanner image processing in the system control unit, since input image data is input directly from a CCD, the image data is stored frame-sequentially in a memory. On the other hand, when performing scanner image processing outside of the system control unit, input image data is stored dot-sequentially in a memory because the image data is from a scanner image processing block. In addition, the present image processing apparatus can include a plurality of buffers for temporarily retaining image data, whereby the image data can be divided and transferred in parallel. As shown, the present image processing apparatus is capable of reducing processing load of subsequent-stage image processing by efficiently transferring image data and switching among image data storage methods depending on the input data.

Furthermore, since an operation in which the scanner image processing block 250 is not used and an operation in which the scanner image processing block 250 is used can be switched, operational modes corresponding to situations can be set.

Second Embodiment

Hereinafter, a second embodiment will be described with reference to FIGS. 11 to 15. For the first embodiment, a case has been described where data output by the scanner image processing block 250 is image data. However, in some cases where high definition images must be accommodated and the like, data output by the scanner image processing block 250 may include both image data and image area data. Therefore, in the present embodiment, a description will be given on processing when data is assumed to include both image data and image area data.

Image area data includes information indicating whether a target region is a character region or a picture region. By performing processing respectively suitable for a character region and a picture region according to the image area data during image processing, the resolution of an entire image including a mix of characters and pictures can be enhanced. For example, image area data indicating a character region/picture region is generated by an edge determination result determined based on the continuity of white pixels and black pixels, a density difference determination between a density of a pixel of interest and an average density of a surrounding area thereof, and the like.

FIG. 15 is a diagram illustrating methods of utilizing image area data in filtering. In filtering, an emphasis filter that enhances a contour is applied to a character region while a smoothing filter is applied to a picture region. Reference numeral 1501 denotes a 5-by-5 filtering table to be referenced during filtering. Filtering is performed on 25 peripheral pixels of a central pixel of interest. In addition, reference numeral 1502 denotes a filter emphasis coefficient and reference numeral 1503 denotes a filter smoothing coefficient. When character region/picture region image area data indicates a character region, the emphasis coefficient 1502 is set to the filtering table 1501 and filtering is executed. In addition, when image area data indicates a picture region, the smoothing coefficient 1503 is set to the filtering table 1501 and filtering is executed.

Even the use of such image area data can be accommodated by changing the processing performed by the data rearrangement unit 220 described in the first embodiment and setting a DMA transfer destination corresponding to the present processing to the DMAC_A 120a.

Hereinafter, a case will be described where, for the same image size as the first embodiment (X number of pixels times Y number of pixels), 1 pixel-1 bit image area data ("Z0" to "Z(X−1)") is output in addition to image data from a scanner image processing unit 211.

Figure 11:
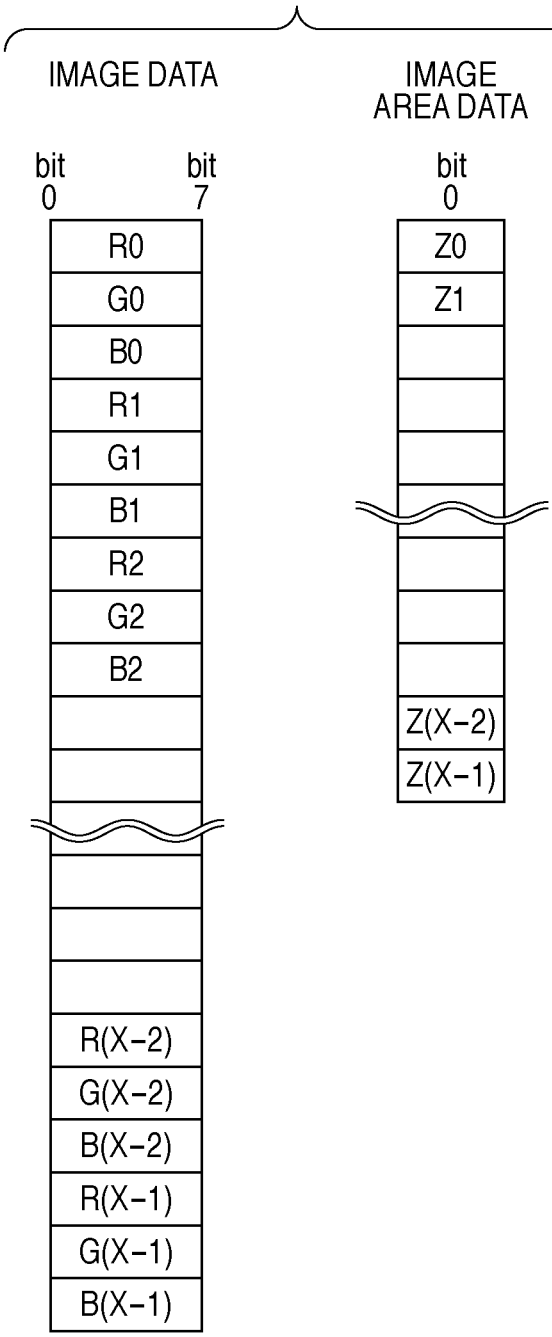
FIG. 11 is a diagram illustrating image data and image area data to be output by a scanner image processing unit 211 according to a second embodiment.
Figure 12:
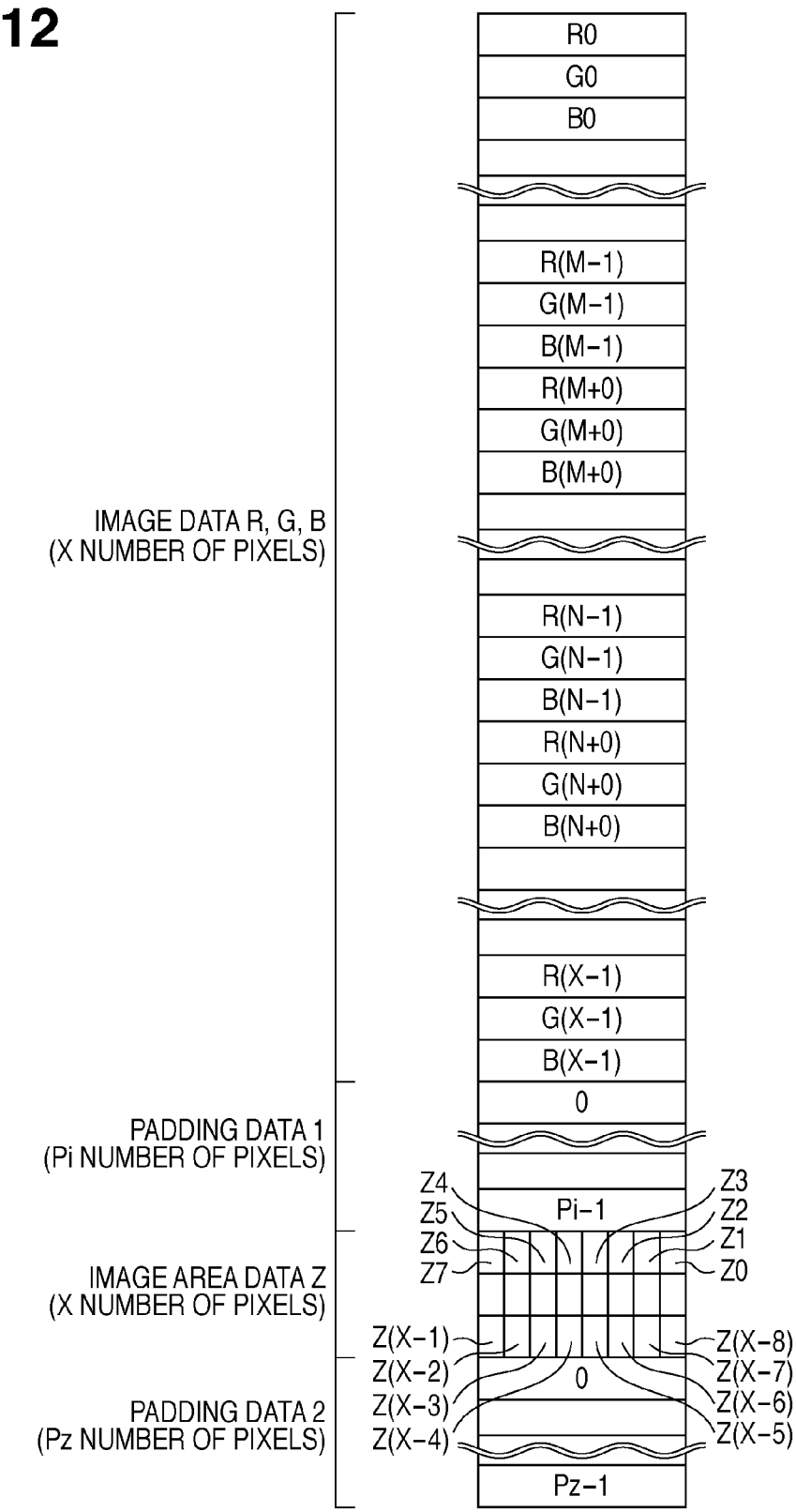
FIG. 12 is a diagram illustrating data to be generated by a data rearrangement unit 220 according to the second embodiment.
Figure 13:
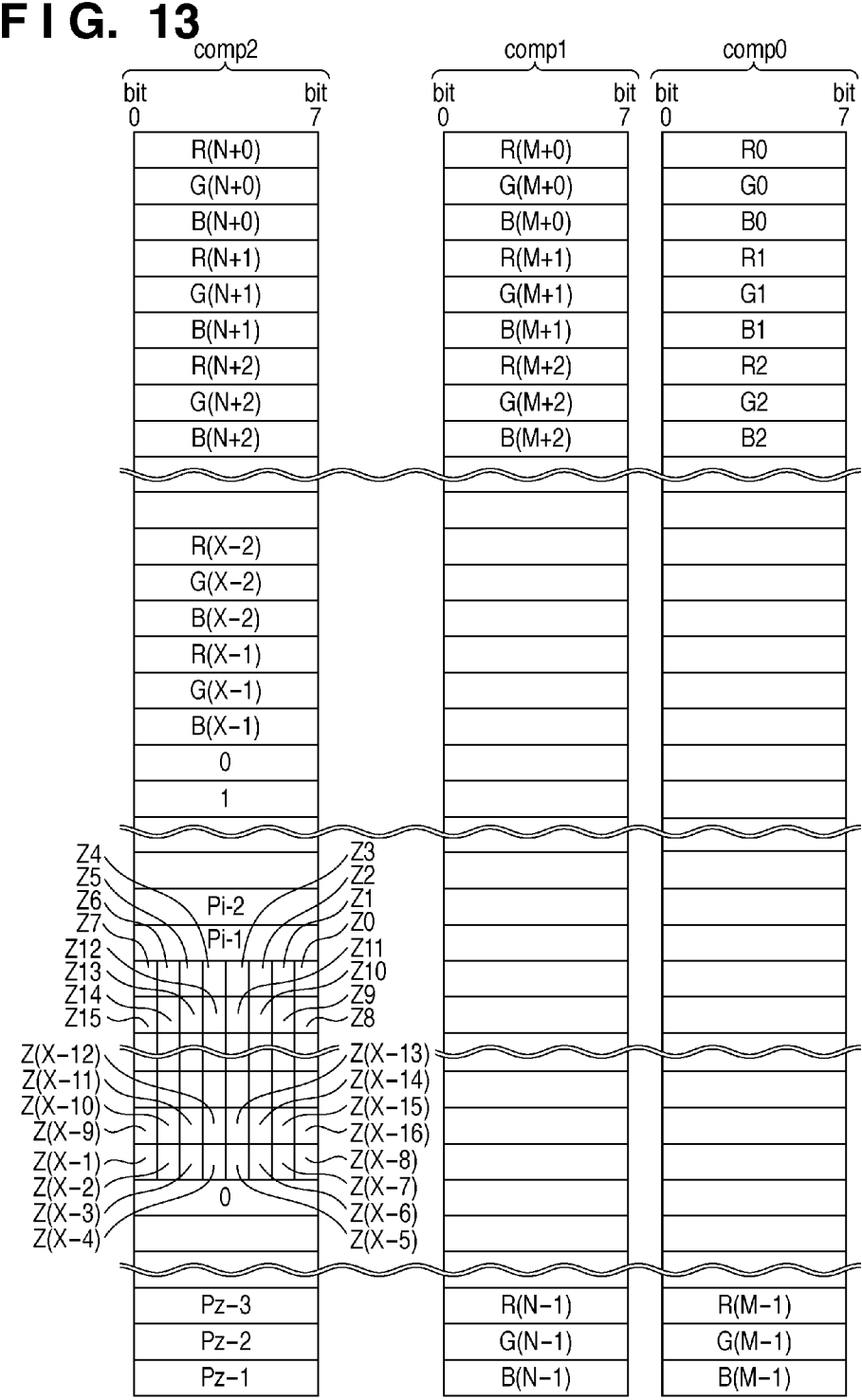
FIG. 13 is a diagram illustrating data after being processed by the data rearrangement unit 220 according to the second embodiment.

FIG. 11 is a diagram illustrating image data and image area data to be output by the scanner image processing unit 211 according to the second embodiment. FIG. 12 is a diagram illustrating data to be generated by a data rearrangement unit 220 according to the second embodiment. FIG. 13 is a diagram illustrating data after being processed by the data rearrangement unit 220 according to the second embodiment.

Figure 14:
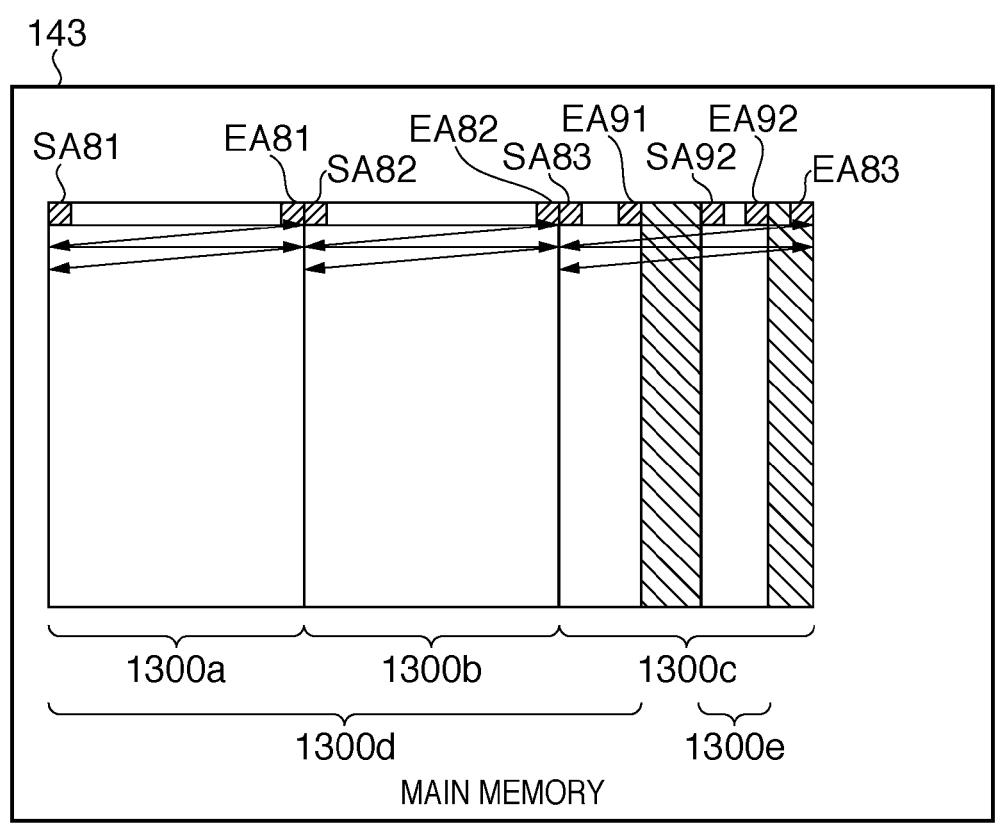
FIG. 14 is a diagram illustrating data after being stored in a main memory 143 according to the second embodiment.

FIG. 14 is a diagram illustrating data after being stored in a main memory 143 according to the second embodiment.

As illustrated in FIG. 11, at the scanner image processing block 250, data after scanner image processing includes 1 bit-per-1 pixel image area data in addition to image data. The data is input to the data rearrangement unit 220. As illustrated in FIG. 12, from image data and image area data, the data rearrangement unit 220 generates, for each line, data with a data length expressed as "image data (R, G, and B)+padding 1 (Pi number of pixels)+image area data (Z)+padding 2 (Pz number of pixels)".

In addition, the data rearrangement unit 220 divides the data illustrated in FIG. 12 at the Mth pixel and the Nth pixel to create three sets of data. The number of pixels after division according to the second embodiment is equal to or greater than a value obtained by dividing by three a sum of a transfer amount of image data, a transfer amount of image area data, a padding 1, and a padding 2.

In the second embodiment, the transfer amount of image data is three times (R, G, and B) X number of pixels, and the transfer amount of image area data is a value obtained by dividing X number of pixels by 8 (a data bus width of one component). Therefore, the Mth pixel takes a value equal to or greater than $\{(X\times3)+(Pi\ number\ of\ pixels)+(X/8)+(Pz\ number\ of\ pixels)\}/3$, and the Nth pixel takes a value that is "double the value of M".

In addition, Pi is set such that image area data starting at "Z0" starts at a boundary of the main memory 143. As illustrated in FIG. 13, data created by the data rearrangement unit 220 is respectively transferred onto data of the respective components of R, G, and B of the scanner I/F unit 110.

1 line transfer destinations of the respective DMACs of the DMAC_A 120a are to be set as follows.

DMAC corresponding to ch0: region 1300a (SA81 to EA81)

DMAC corresponding to ch1: region 1300b (SA82 to SA82)

DMAC corresponding to ch2: region 1300c (SA83 to EA83)

As illustrated in FIG. 14, DMA-transferred data under the present setting is stored in a region 1300d of the main memory 143, while image area data is stored in a region 1300e. In addition, padding 1 (Pi) is set to a start address SA92 from which image area data is to be stored so that image area data starts from a predetermined boundary to ensure memory access is efficiently performed.

When a subsequent-stage image processing unit reads image data stored in the main memory 143, the region 1300d (SA81 to EA91) is set as the DMAC transfer destination, and when reading image area data, the region 1300e (SA92 to EA92) is set as the DMAC transfer destination.

As described above, even when data after image processing by a scanner image processing block includes image area data in addition to image data, an image processing apparatus according to the present embodiment achieves efficient image data transfer by dividing data including both image data and image area data. By setting DMA transfer destinations and performing data division in this manner, memory access by a subsequent-stage image processing unit can now be performed efficiently with respect to image data and image area data, and in a similar manner to the first embodiment, the overall performance of the image processing apparatus can be improved.

The present invention is capable of providing, for example, an image processing apparatus that changes methods of storage to a memory depending on image data to be input and improves overall image processing performance, as well as a control method of the image processing apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001826 filed on Jan. 7, 2009, which is hereby incorporated by reference herein in its entirety.

What is claimed is:

1. An image processing apparatus that stores image data input from a reading device that reads an original document and generates image data, the image processing apparatus comprising:

an input unit that inputs the image data from the reading device;

a memory that stores the image data input by the input unit;

a designator that designates an address for storing the image data into the memory, based on whether or not the image data is input via an image processing device that performs data rearrangement of the image data, wherein the image processing device is detachably connectable to the image processing apparatus; and a controller that controls the image processing apparatus to store the image data into the memory according to the address designated by the designator.

2. The image processing apparatus according to claim 1, wherein the designator designates the address so that the image data is stored, when the image data is input via the image processing device, by a dot-sequential storage method, and, when the image data is not input via the image processing device, by a frame-sequential storage method.

3. The image processing apparatus according to claim 1, further comprising:

a same number of buffers as a number of color components of image data input by the input device for temporarily retaining the image data, wherein the reading device inputs in parallel, into each buffer, data of different color components, and the image processing device includes a division unit that divides the image data generated by the reading device into a same number of sets as the number of color components of the image data; and a transfer unit that transfers, in parallel, the sets of divided data divided by the division unit to each buffer.

4. The image processing apparatus according to claim 3, wherein the division unit divides one line of the image data processed by the image processing device at an Mth pixel and at an Nth pixel, where M denotes a value equal to or greater than one third of the number of pixels in one line, and N denotes a value that is double the value of M.

5. An image processing apparatus that stores image data input from a reading device that reads an original document and generates image data, the image processing apparatus comprising:
　an input unit that inputs the image data from the reading device;
　a memory that stores the image data input by the input unit;
　a designator that designates an address for storing the image data into the memory, based on whether or not the image data is input via an image processing device that performs data rearrangement of the image data, wherein the image processing device is detachably connectable to the image processing apparatus;
　a controller that controls the image processing apparatus to store the image data into the memory according to the address designated by the designator;
　a same number of buffers as a number of color components of image data input by the input device for temporarily retaining the image data, wherein
　　the reading device inputs in parallel, into each buffer, data of different color components, and
　　the image processing device includes a division unit that divides the image data generated by the reading device into a same number of sets as the number of color components of the image data, such that when the number of color components of the image data is three, the division unit divides one line of the image data processed by the image processing device into three sets of divided data at an Mth pixel and at an Nth pixel, where M denotes a value equal to or greater than one third of the number of pixels in one line, and N denotes a value that is double the value of M, wherein the three sets of divided data all have a same data size as each other, and a padding value is added to a set of the divided data including information of the Nth and subsequent pixels among the three sets of divided data to conform to the same data size; and
　a transfer unit that transfers, in parallel, the sets of divided data divided by the division unit to each buffer.

6. The image processing apparatus according to claim 3, wherein
　image data subjected to image processing by the image processing device includes image area data that indicates whether a target region is a character region or a picture region,
　the division unit divides data including the image data subjected to image processing by the image processing device and the image area data at an Mth pixel and an Nth pixel, where
　M denotes a value equal to or greater than one third of the data that includes the image data and the image area data, and
　N denotes a value that is double the value of M.

7. An image processing apparatus that stores image data input from a reading device that reads an original document and generates image data, the image processing apparatus comprising:
　an input unit that inputs the image data from the reading device;
　a memory that stores the image data input by the input unit;
　a designator that designates an address for storing the image data into the memory, based on whether or not the image data is input via an image processing apparatus that performs data rearrangement of the image data, wherein the image processing device is detachably connectable to the image processing apparatus;
　a controller that controls the image processing apparatus to store the image data into the memory according to the address designated by the designator;
　a same number of buffers as a number of color components of image data input by the input device for temporarily retaining the image data, wherein
　　the reading device inputs in parallel, into each buffer, data of different color components, and
　　the image processing device includes a division unit that divides the image data generated by the reading device into a same number of sets as the number of color components of the image data, wherein image data subjected to image processing by the image processing device includes image area data that indicates whether a target region is a character region or a picture region, such that when the number of color components of the image data is three, the three sets of divided data that corresponds to data including the image data and the image area data all have a same data size as each other, and a padding value is added together with the image area data to a set of the divided data including information of the Nth and subsequent pixels among the three sets of divided data to conform to the same data size, and
　　the division unit divides data, including the image data subjected to image processing by the image processing device and the image area data at an Mth pixel and at an Nth pixel, where M denotes a value equal to or greater than one third of the data that includes the image data and the image area data, and N denotes a value that is double the value of M, into sets of divided data; and
　a transfer unit that transfers, in parallel, the sets of divided data divided by the division unit to each buffer.

8. A control method of an image processing apparatus that stores image data input from a reading device that reads an original document and generates image data, the control method comprising steps of:
　inputting the image data from the reading device;
　designating an address for storing the image data into a memory, based on whether or not the image data is input via an image processing device that performs data rearrangement of the image data, wherein the image processing device is detachably connectable to the image processing apparatus; and
　storing the image data input in the inputting step into the memory according to the address designated in the designating step.

9. An image processing apparatus that stores image data input from a reading device that reads an original document and generates image data, the image processing apparatus comprising:
　an input unit that inputs the image data from the reading device;
　a memory that stores the image data input by the input unit;
　a designator that designates an address for storing the image data into the memory, so that the image data is stored by dot-sequential storage method, when the image data is input via an image processing device that performs data rearrangement of the image data, wherein the image processing device is detachably connectable to the image processing apparatus; and a controller that controls to store the image data into the memory according to the address designated by the designator.

* * * * *